No. 677,839. Patented July 2, 1901.
J. N. YOUNG.
ANCHOR.
(Application filed Feb. 16, 1901.)
(No Model.)
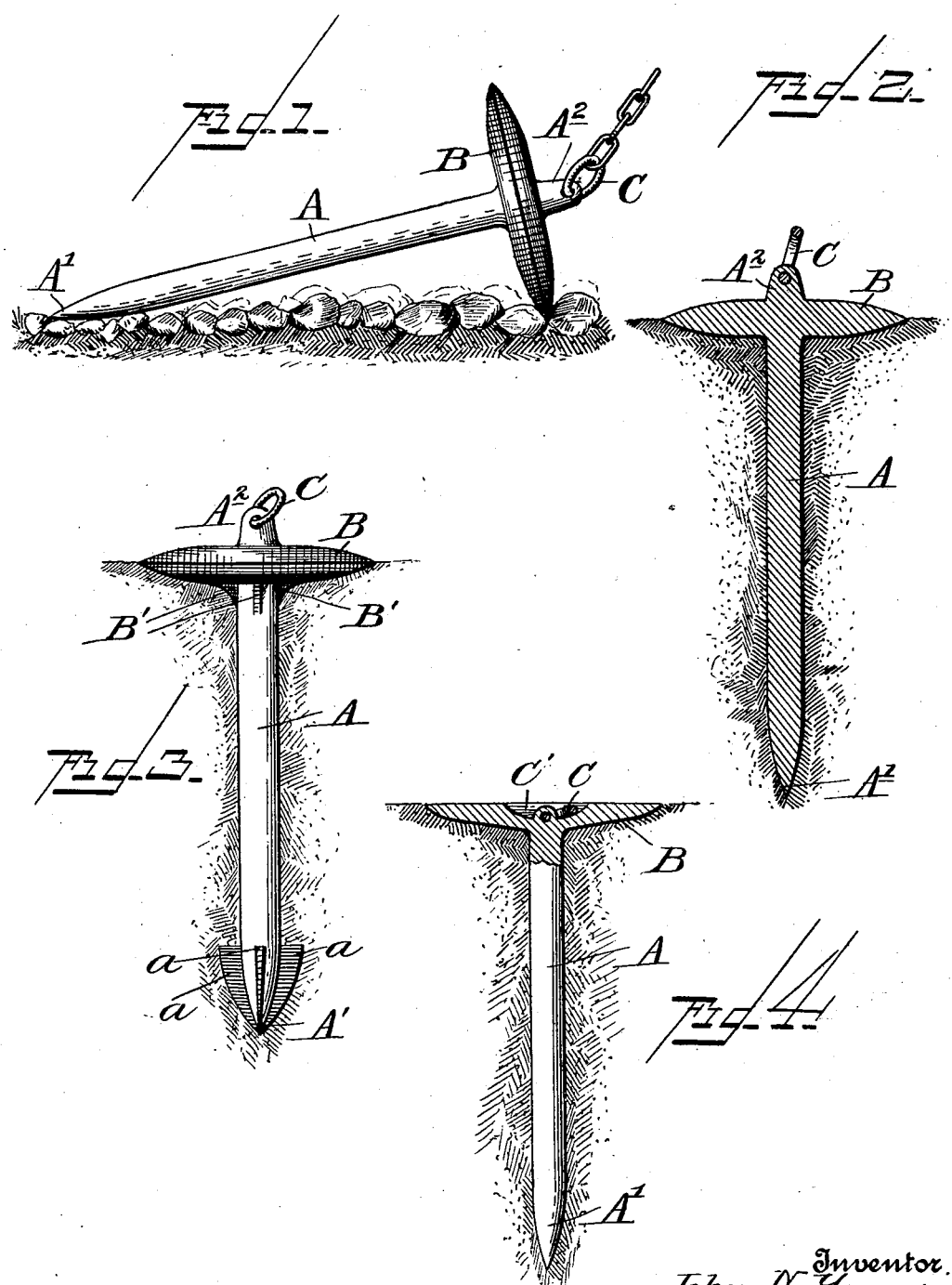
Witnesses
Franck L. Ourand
Grace T. Brereton
Inventor:
John N. Young.
by Sturtevant & Ourley
Attorneys

UNITED STATES PATENT OFFICE.

JOHN N. YOUNG, OF ALAMEDA, CALIFORNIA.

ANCHOR.

SPECIFICATION forming part of Letters Patent No. 677,839, dated July 2, 1901.

Application filed February 16, 1901. Serial No. 47,591. (No model.)

*To all whom it may concern:*

Be it known that I, JOHN N. YOUNG, a citizen of the United States, residing at Alameda, in the county of Alameda, State of California, have invented certain new and useful Improvements in Anchors, of which the following is a description, reference being had to the accompanying drawings, and to the letters of reference marked thereon.

My invention relates to anchors for vessels; and its object is to provide an anchor which shall be simple and inexpensive in construction and while particularly adapted for use in muddy or soft bottom shall possess great holding power when used on hard or rocky bottom and with which under whatever circumstances used the cable cannot foul.

The principal features of my invention are a shank having a generally cylindrical shape having its lower end pointed, so as to readily sink into soft bottom by its own weight, and a substantially circular rim or disk arranged on the shank at or near its upper end.

In the drawings, Figure 1 is a perspective view of my improved anchor in the position which it assumes on hard or rocky bottom. Fig. 2 is a vertical sectional view of the anchor in the position which it assumes on soft or muddy bottom. Fig. 3 is a perspective view of a modified form of anchor in the position which it assumes on soft or muddy bottom, and Fig. 4 is a vertical sectional view of a modified form of my anchor particularly adapted for yachts and small vessels.

A is the shank of my anchor. This is preferably substantially cylindrical for the main portion of its length. At its lower end it tapers to a point A'. This shank is made of sufficient size and weight to cause it to readily enter soft bottom by its own weight. In the form shown in Figs. 1, 2, and 3 the shank carries near its upper end a rim or disk B, preferably substantially circular in form. The diameter of this rim or disk is preferably slightly less than one-half the length of the shank. Above the rim or disk B the shank projects a short distance, as shown at $A^2$, and in the end of this portion $A^2$ is secured a ring C, to which the cable is attached. The rim or disk B is preferably slightly thicker where it joins the shank than at its circumference, its outer edge being sufficiently sharp to penetrate the thin layer of soft material commonly found on hard bottom or to engage any inequalities found on such bottom. The rim or disk is preferably substantially at right angles to the axis of the shank.

In the modified form shown in Fig. 3 I provide the shank A near its point with ribs or flukes $a$, extending from the point A' upward a short distance along the shank and terminating at right angles to the axis of the shank. These ribs or flukes aid in preventing the shank from being pried out of the mud which it has entered. In the same figure I show the rim or disk B strengthened by providing it with longitudinal ribs at B', where it joins the shank A.

In Fig. 4 I have shown the rim or disk at the upper end of the shank. By thus dispensing with the extension $A^2$ and by securing the ring C in a depression C', formed in the upper face of the rim or disk B, the anchor is adapted to be conveniently carried on the deck of a vessel by simply turning it point up, the flat upper surface of the rim or disk B resting flat upon the deck.

The shank and rim or disk B will in the case of anchors intended for yachts and vessels of small tonnage be conveniently made by casting it complete in one piece. In case of very heavy anchors it may be found desirable to cast or otherwise form the shank and rim separately and unite them by any well-known method.

In use the anchor should, in muddy or sandy bottom, be dropped perpendicularly from the vessel, so that its point A' will enter the mud or sand by its own weight. As cable is then paid out the strain upon the anchor will be at substantially a right angle to the axis of the shank A, the shank acting as a stake. The tendency to pull the shank out of the perpendicular will be resisted by the rim or disk B, which by reason of its large surface will not be easily forced into the mud or sand. When the anchor is to be weighed, it will be readily withdrawn when the vessel is brought directly above it.

As the rim B presents no point for engagement of the cable, the cable cannot become fouled.

On hard bottom the rim or disk B will act somewhat like the flukes of an anchor of ordinary construction, the rim or disk being kept at an inclination to the surface of the bottom by the weight of the shank.

Having thus described my invention, what I claim, and desire to secure by Letters Patent, is—

1. In an anchor, the combination of a shank pointed at its lower end, a rim or disk of a diameter less than one-half the length of the shank near its upper end, and means for securing the cable to the upper end of the shank; substantially as described.

2. In an anchor, the combination of a shank pointed at its lower end and provided near its lower end with ribs or flukes extending along a portion of its length, a rim or disk of a diameter less than one-half the length of the shank near its upper end, and means for securing the cable to the upper end of the shank; substantially as described.

3. In an anchor, the combination of a shank pointed at its lower end, a rim or disk of a diameter less than one-half the length of the shank at the upper end of the shank, a recess in the upper face of the rim or disk and means for attaching the cable secured within the recess and adapted to lie within the recess when not in use; substantially as described.

In testimony whereof I affix my signature in presence of two witnesses.

JOHN N. YOUNG.

Witnesses:
 HIRAM M. HAMILTON,
 STERLING W. SMITH.